(12) United States Patent
MacInnis

(10) Patent No.: US 9,094,686 B2
(45) Date of Patent: Jul. 28, 2015

(54) SYSTEMS AND METHODS FOR FASTER THROUGHPUT FOR COMPRESSED VIDEO DATA DECODING

(75) Inventor: Alexander MacInnis, Los Altos, CA (US)

(73) Assignee: BROADCOM CORPORATION, Irvine, CA (US)

(*) Notice: Subject to any disclaimer, the term of this patent is extended or adjusted under 35 U.S.C. 154(b) by 489 days.

(21) Appl. No.: 11/850,219

(22) Filed: Sep. 5, 2007

(65) Prior Publication Data
US 2014/0307793 A1  Oct. 16, 2014

Related U.S. Application Data

(60) Provisional application No. 60/824,637, filed on Sep. 6, 2006.

(51) Int. Cl.
*H04N 19/44* (2014.01)
*H04N 19/43* (2014.01)

(52) U.S. Cl.
CPC .............. *H04N 19/44* (2013.01); *H04N 19/43* (2013.01)

(58) Field of Classification Search
CPC ................. H04N 19/00587; H04N 19/00509; H04N 19/0063; H04N 7/2626; H04N 7/361; H04N 7/50; H04N 7/26244; H04N 5/145; H04N 7/26765; H04N 7/26015; H04N 19/00909; H04N 19/00733; H04N 19/00533; H04N 19/43; H04N 19/44
USPC .................................................... 375/240.16
See application file for complete search history.

(56) References Cited

U.S. PATENT DOCUMENTS

| | | | | |
|---|---|---|---|---|
| 5,944,800 A * | 8/1999 | Mattheis et al. | ................. | 710/23 |
| 6,650,705 B1 * | 11/2003 | Vetro et al. | ............... | 375/240.08 |
| 7,706,447 B2 * | 4/2010 | Karczewicz et al. | ...... | 375/240.2 |
| 7,720,294 B2 * | 5/2010 | Bidnur et al. | .................. | 382/233 |
| 7,738,563 B2 * | 6/2010 | Pelc et al. | ................. | 375/240.29 |
| 7,822,123 B2 * | 10/2010 | Lin et al. | .................. | 375/240.24 |
| 7,839,933 B2 * | 11/2010 | Lin et al. | .................. | 375/240.24 |
| 7,889,393 B2 * | 2/2011 | Yoshizawa | .................... | 358/3.01 |
| 2003/0137695 A1 * | 7/2003 | Nomizu | ........................ | 358/1.16 |
| 2003/0156646 A1 * | 8/2003 | Hsu et al. | ................. | 375/240.16 |
| 2003/0185306 A1 * | 10/2003 | MacInnis et al. | ........ | 375/240.25 |
| 2004/0258162 A1 * | 12/2004 | Gordon et al. | ........... | 375/240.25 |
| 2005/0062746 A1 * | 3/2005 | Kataoka et al. | ............... | 345/505 |
| 2005/0094729 A1 * | 5/2005 | Yuan et al. | ............... | 375/240.16 |
| 2005/0123057 A1 * | 6/2005 | MacInnis et al. | ........ | 375/240.25 |
| 2005/0249290 A1 * | 11/2005 | Gordon et al. | ........... | 375/240.18 |
| 2005/0249291 A1 * | 11/2005 | Gordon et al. | ........... | 375/240.18 |
| 2006/0256854 A1 * | 11/2006 | Jiang | ........................ | 375/240.03 |
| 2007/0071106 A1 * | 3/2007 | Graham et al. | ........... | 375/240.24 |

OTHER PUBLICATIONS

Nguyen et al, Performance Analysis of an H.263 Video Encoder for VIRAM, 2000.*

* cited by examiner

*Primary Examiner* — Shan Elahi
(74) *Attorney, Agent, or Firm* — Foley & Lardner LLP

(57) ABSTRACT

Presented herein are system(s) and method(s) for faster throughput for video decoding. In one embodiment, there is presented a pixel reconstructor for generating reconstructed pixels. The pixel reconstructor comprises a SIMD processor, a data access unit, and a circuit. The SIMD processor applies at least one prediction error to at least one block of prediction pixels. The data access unit provides the at least one prediction error and the at least one block of prediction pixels. A circuit determines whether two or more prediction errors and two or more prediction pixels can be concurrently processed by the SIMD processor.

16 Claims, 6 Drawing Sheets

SYSTEMS AND METHODS FOR FASTER THROUGHPUT FOR COMPRESSED VIDEO DATA DECODING

RELATED APPLICATIONS

This application claims priority to "Systems and Methods for Faster Throughput for Compressed Video Data Decoding", Provisional Patent Application, Ser. No. 60/824,637, filed Sep. 6, 2006, by MacInnis, and said application is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Compression is often used to reduce the amount of bandwidth used to transfer video data, and reduce the amount of memory that is used to store the video data. However, decompressing compressed video data can be computationally intense and can use a large amount of processing power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in system(s) and method(s) for faster throughput for decoding compressed video data, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
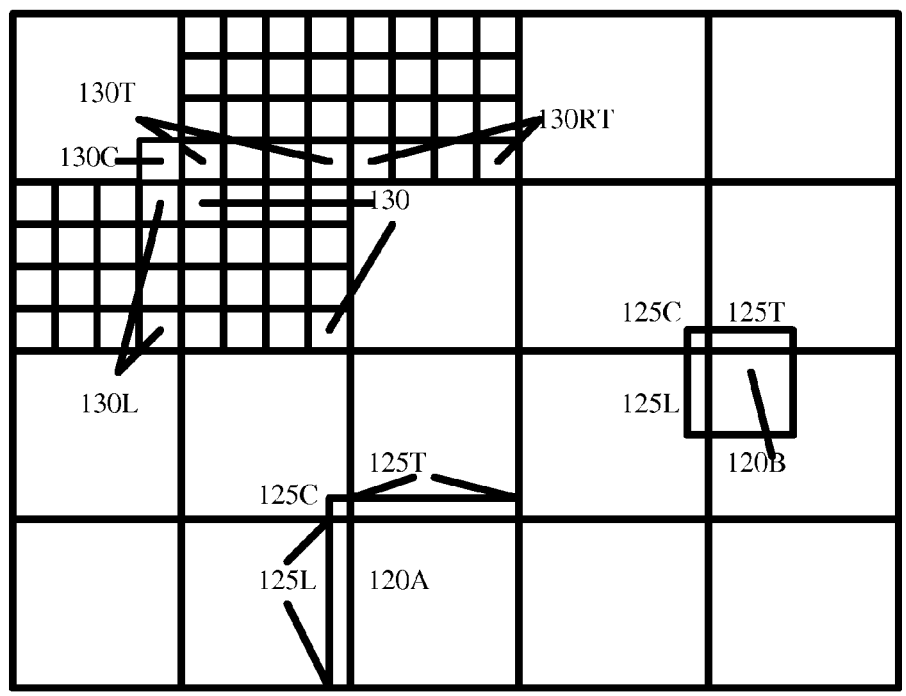
FIG. 1 is a block diagram describing spatially predicted macroblocks.

Referring now to FIG. 1, there is illustrated a block diagram describing intra-coded macroblocks 120 using spatial prediction. Spatial prediction, also referred to as intra prediction, involves prediction of pixels from neighboring pixels. The pixels of a macroblock 120 can be predicted, either in a 16×16 mode, an 8×8 mode, or a 4×4 mode.

The difference between the macroblock 120a and prediction pixels P is known as the prediction error E. The prediction error E is calculated and encoded along with an identification of the prediction pixels and prediction mode, as will be described. A macroblock 120 is encoded as the combination of coded prediction errors E, prediction modes, and partitions 130.

Figure 2:
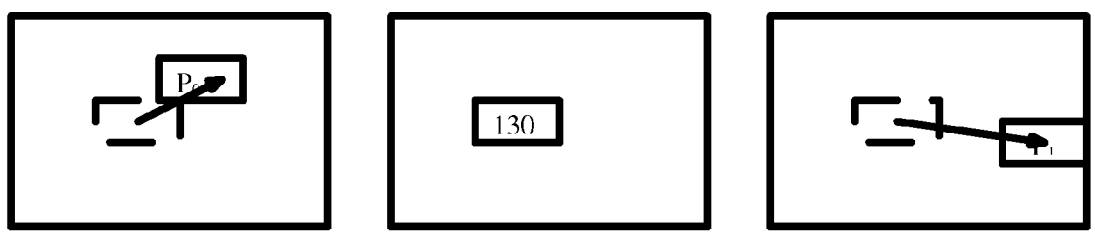
FIG. 2 is a block diagram describing temporally predicted macroblocks.
Figure 2:
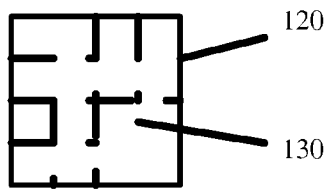

Referring now to FIG. 2, there is illustrated a block diagram describing temporally encoded macroblocks 120. The temporally encoded macroblocks 120 can be divided into 16×8, 8×16, 8×8, 4×8, 8×4, and 4×4 partitions 130. Each partition 130 of a macroblock 120, is compared to the pixels of other frames or fields for a similar block of pixels P. The similar block of pixels P can either be derived directly from or be generated by interpolation from a block of reference pixels from another frame or field. In H.264, the prediction pixels can be generated by interpolation with ¼ pixel resolution from reference pixels. A macroblock 120 is encoded as the combination of the coded prediction errors E, motion vectors, reference picture identification, and partitions 130.

The difference between the partition 130 and the prediction pixels P is known as the prediction error E. The prediction error E is calculated and encoded, along with an indicator of the reference pixels and prediction pixels P. Motion vectors MV indicate the reference pixels and prediction pixels P. Motion vectors MV describe the spatial displacement between the partition 130 and the reference pixels and provide an indicator of the manner of interpolating the prediction pixels P.

The partition can also be predicted from blocks of pixels P in more than one field/frame. In bi-predicted coding, the partition 130 can be predicted from two weighted blocks of pixels, P0 and P1. Accordingly a prediction error E is calculated as the difference between the weighted average of the prediction blocks w0P0+w1P1 and the partition 130. The prediction error E and an identification of the prediction blocks P0, P1 are encoded. The prediction blocks P0 and P1 are identified by motion vectors MV.

With both spatial prediction and temporal prediction, the macroblock 120 is represented by a prediction error E. The prediction error E for a macroblock is also a two-dimensional grid of pixel values. A transformation can be applied to the prediction error E, thereby representing .the prediction error E by transform coefficients.

The sets of transform coefficients are then quantized and scanned.

Figure 3:
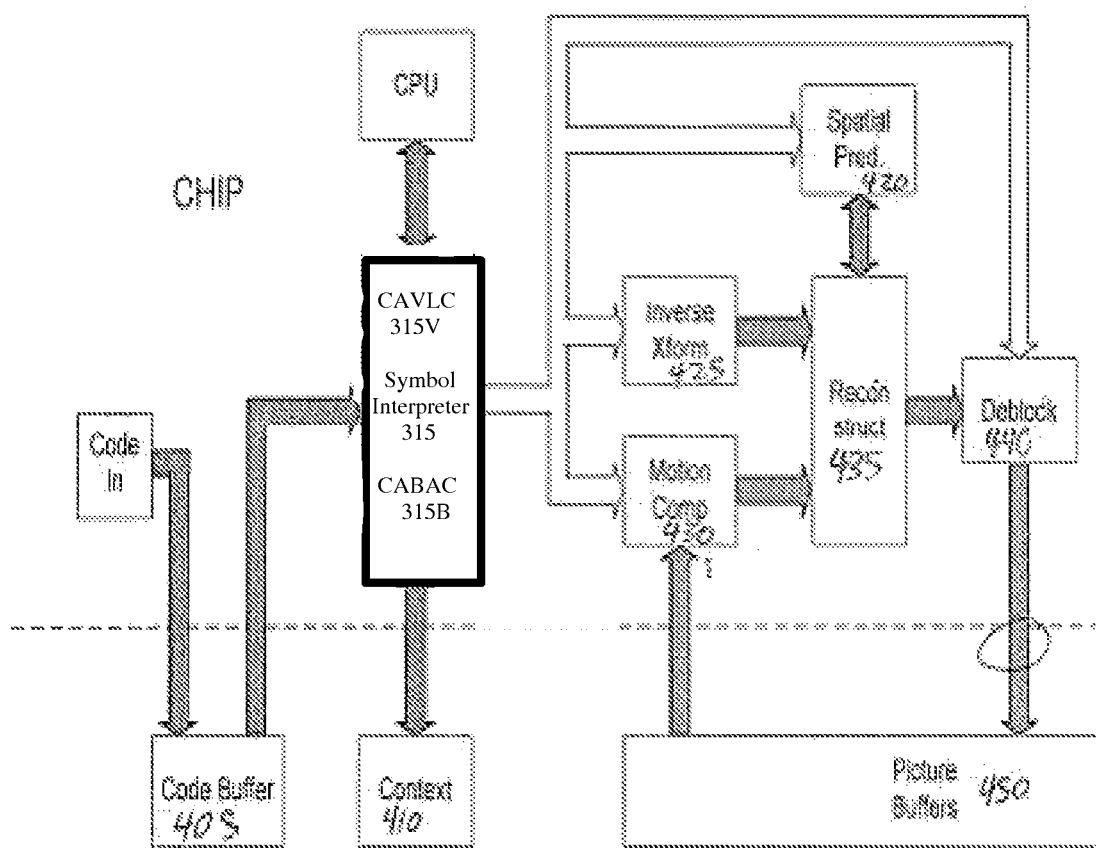
FIG. 3 is a block diagram of a video decoder in accordance with an embodiment of the present invention.

Referring now to FIG. 3, there is illustrated a block diagram describing an exemplary video decoder 300 in accordance with an embodiment of the present invention. The video decoder 400 includes a code buffer 405 for receiving a video elementary stream. The code buffer 405 can be a portion of a memory system, such as a dynamic random access memory (DRAM). A symbol interpreter 315 in conjunction with a context memory 410 decode the CABAC and CAVLC symbols from the bitstream. The context memory 410 can be another portion of the same memory system as the code buffer 405, or a portion of another memory system. The symbol interpreter 315 includes a CAVLC decoder 315V and a CABAC decoder 315B. The motion vector data and the quantized transformed coefficient data can either be CAVLC or CABAC coded. Accordingly, either the CAVLC decoder 315V or CABAC decoder 315B decodes the CAVLC or CABAC coding of the motion vectors data and transformed coefficient data.

The symbol interpreter 315 provides the sets of scanned quantized frequency coefficients $F_0 \ldots F_n$ to an inverse scanner, inverse quantizer, and inverse transformer (ISQT) 425. Depending on the prediction mode for the macroblock 120 associated with the scanned quantized frequency coefficients, the symbol interpreter 315 provides motion vectors to the motion compensator 430, where motion compensation is applied. Where spatial prediction is used, the symbol interpreter 315 provides intra-mode information to the spatial predictor 420.

The ISQT 425 constructs the prediction error E. The spatial predictor 320 generates the prediction pixels P for spatially predicted macroblocks while the motion compensator 430 generates the prediction pixels P for temporally predicted macroblocks. The motion compensator 330 retrieves the necessary reference pixels for generating the prediction pixels P, or P0, P1 from picture buffers 450 that store previously decoded frames 100 or fields 110.

A pixel reconstructor 435 receives the prediction error E from the ISQT 425, and the prediction pixels P from either the motion compensator 430 or spatial predictor 420. The pixel reconstructor 435 reconstructs the macroblock 120 from the foregoing information and provides the macroblock 120 to a deblocker 440. The deblocker 440 smoothes pixels at the edges of the macroblock 120 to reduce the appearance of blocking. The deblocker 440 writes the decoded macroblock 120 to the picture buffer 450.

The foregoing can utilize a large number of computations. A single instruction multiple data (SIMD) processor can be advantageous for the foregoing for a variety of reasons. A SIMD processor has the advantage of providing a large amount of data throughput while efficiently using chip space that is occupied by instruction memory.

In certain embodiments of the present invention, a SIMD processor can be used that is wide enough to accommodate the largest case, e.g., 21 pixels. Additionally, a data access unit DAU can be used to provide the data to the SIMD processor. This is particularly useful in cases where the reference pixels are smaller than the largest case. The DAU can perform a variety of functions, such as organizing data so that operations can be consolidated.

Figure 4:
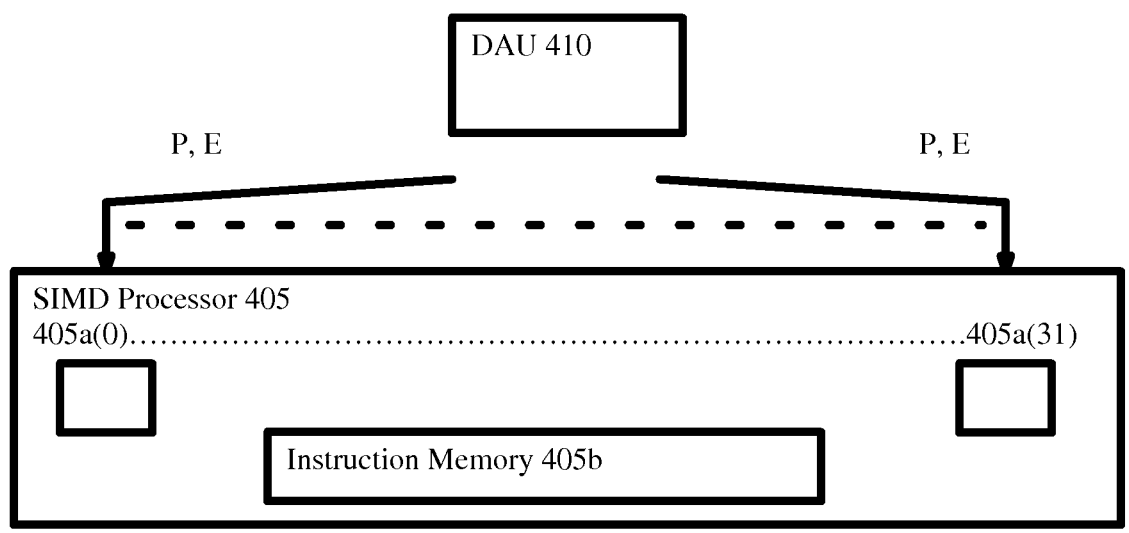
FIG. 4 is a block diagram of an exemplary pixel reconstructor in accordance with an embodiment of the present invention.

Referring now to FIG. 4, there is illustrated a block diagram of an exemplary pixel reconstructor 435 in accordance with an embodiment of the present invention. The pixel reconstructor 435 comprises a SIMD processor 405 and a DAU 410.

According to certain embodiments of the present invention, the SIMD processor 405 is wide enough to operate on the widest row of reference pixels, e.g., 21 pixels. For example, the SIMD processor 405 can comprise 32 processing elements $405a(0) \ldots 405a(31)$. Each processing element $405a(0) \ldots 405a(31)$ performs the operations that are dictated by instructions from an instruction memory 405b.

The DAU 410 provides the pixels from the prediction error E and the prediction pixels P to the SIMD processor 405, one row at a time. The processing elements 405a each receive one pixel from a row in the prediction error E and a corresponding pixel from a row in the prediction pixels P. The processing elements 405a together apply a row from the prediction error E to a corresponding row from the prediction pixels P, to generate a row from the reconstructed partition 130. Where the SIMD 405 comprises 32 processing elements 405a, the SIMD 405 is wide enough to process an entire row for the largest partition.

In cases where the partitions are smaller, the DAU 410 can consolidate more than one prediction error E and sets of prediction pixels P. Accordingly, the SIMD 405 can generate an entire row for more than one partition. The DAU 410 can include logic that optimizes the scheduling of the operations that are performed on the prediction pixels P and prediction error E of a macroblock.

Figure 5:
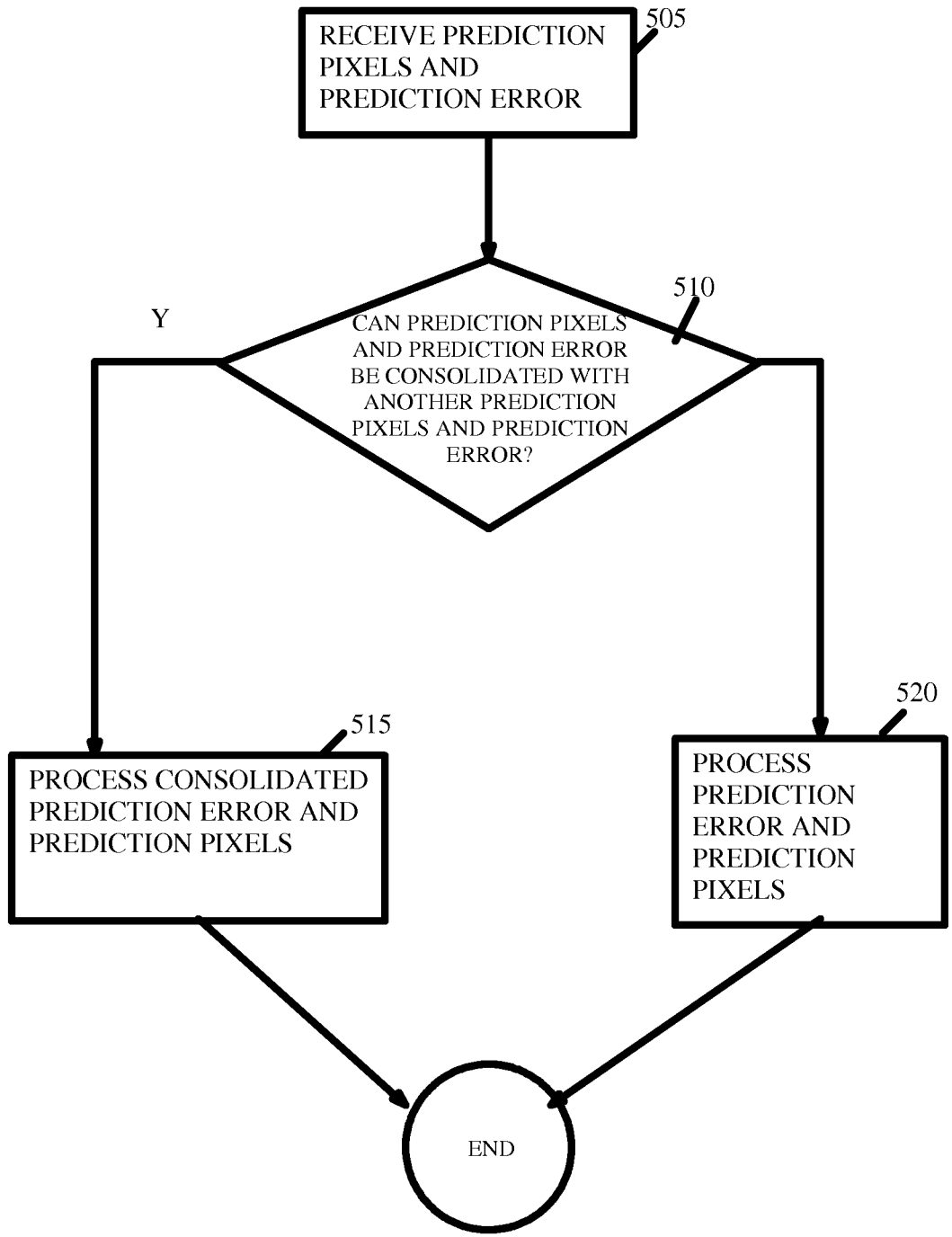
FIG. 5 is a flow diagram describing the operation of a pixel reconstructor in accordance with an embodiment of the present invention.

Referring now to FIG. 5, there is illustrated a flow diagram for pixel reconstruction in accordance with an embodiment of the present invention. At 505, the DAU 410 receives the prediction pixels P and the prediction error E. At 510, the DAU 410 determines whether the prediction pixels P and prediction error E can be consolidated with another set of prediction pixels P and prediction error E. If at 510, the prediction pixels P and prediction error E can be consolidated, the DAU 410 consolidates the prediction pixels P and prediction errors E. At 515, the SIMD processor 405 processes the consolidated prediction pixels P and prediction errors E to generate the reconstructed pixels associated with each.

If at 510, the prediction pixels P and prediction error E cannot be consolidated, at 520, the SIMD processor 405 processes the prediction pixels P and prediction error E to generate the partition associated, therewith.

Figure 6:
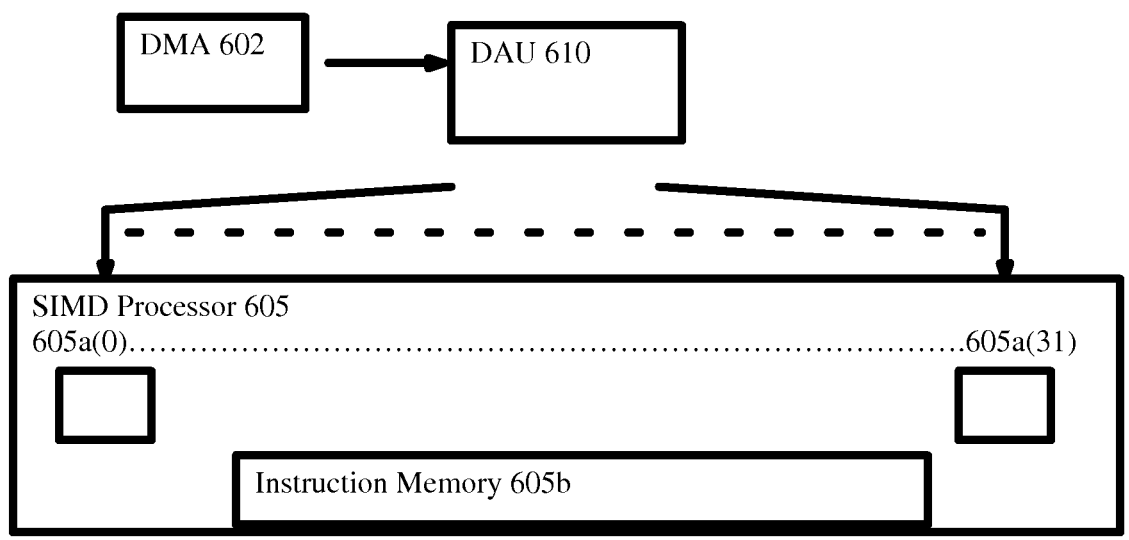
FIG. 6 is a block diagram of an exemplary motion compensator in accordance with an embodiment of the present invention.

Referring now to FIG. 6, there is illustrated a block diagram of an exemplary motion compensator 430. The motion compensator 330 comprises a DMA 602, a SIMD processor 605, and a DAU 610. The direct memory access unit 602 fetches the reference pixels P.

According to certain embodiments of the present invention, the SIMD processor 605 is wide enough to operate on the widest row of reference pixels, e.g., 21 pixels. For example, the SIMD processor 605 can comprise 32 processing elements $605a(0) \ldots 605a(31)$. Each processing element $605a(0) \ldots 605a(31)$ performs the operations that are dictated by instructions from an instruction memory 605b.

Where the prediction pixels P are interpolated from reference pixels, the DMA 602 fetches the reference pixels from the picture buffer 350 and the SIMD 605 interpolates the prediction pixels P from the reference pixels. Where the prediction pixels P are bi-directionally predicted, the DMA 602 fetches the reference pixels and the SIMD 605 applies any interpolation and weighting operations to generate the prediction pixels P-.

The DMA 602 provides the reference pixels to the DAU 610. The DAU 610 provides the reference pixels to the SIMD processor 605, one row at a time. The processing elements 605a each receive one pixel from a row of the fetched pixels. The processing elements 605a together generate a row of prediction pixels P from the reference pixels. Where the SIMD 605 comprises at least 21 processing elements 605a, for example, 32 processing elements, the SIMD 605 is wide enough to process an entire row for the largest block of interpolation pixels.

In cases where the blocks of reference pixels are smaller, the DAU 610 can consolidate more than one block of prediction pixels P. Accordingly, the SIMD 605 can generate an entire row for more than one block of prediction pixels. The DAU 610 can include logic that optimizes the scheduling of the operations that are performed on the prediction pixels P and prediction error E of a macroblock.

Additionally, it is noted that the pixels can be stored or packed in memory in a variety of ways. For example wide memory words can store a number of pixels. A direct memory access DMA unit 602 can fetch the memory words that store the desired number of pixels. Where only a subset of pixels are needed, the DAU 610 can provide the pixels that are needed to the SIMD processor 605.

Figure 7:
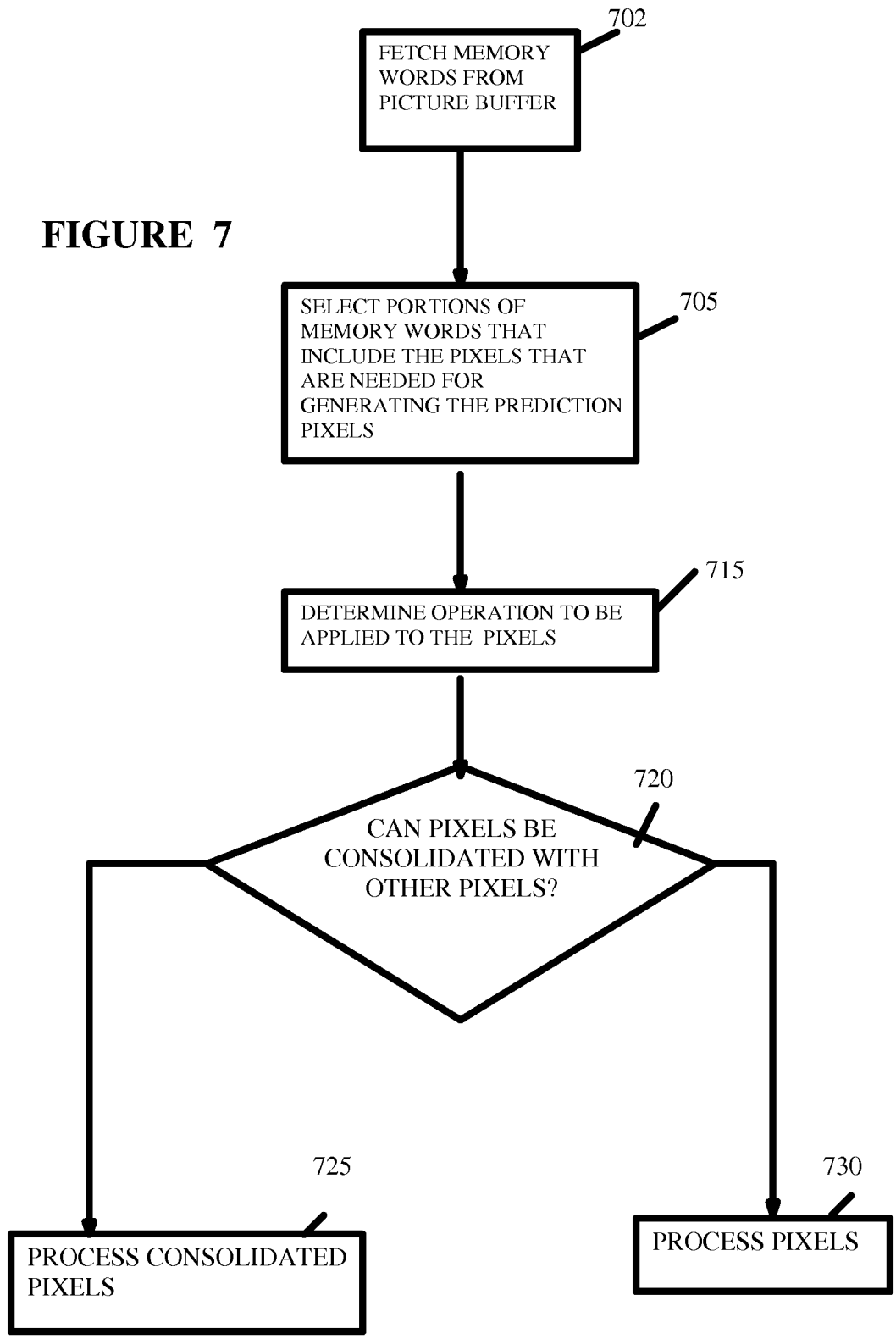
FIG. 7 is a flow diagram describing the operation of a motion compensator in accordance with an embodiment of the present invention.

Referring now to FIG. 7, there is illustrated a flow diagram for motion compensation in accordance with an embodiment of the present invention. At 702, the DMA unit fetches the memory words from the picture buffer 350 that are needed for generating the prediction pixels P. At 705, the DAU 610 receives the memory words that are fetched by the DMA unit 602. At 710, the DAU 610 selects the portions of the memory words that include the pixels that are needed for generating the prediction pixels.

At 715, the DAU 610 determines the operation that is to be applied to the pixels. For example, the operations can include interpolation or weighting. At 720, the DAU 610 determines whether the operation can be consolidated with the same operation for other pixels.

If during 720, the operations can be consolidated, the DAU 610 consolidates the operations and at 725, the SIMD processor 605 performs the operations on the consolidated pixels. If during 720, the operation cannot be consolidated, the SIMD processor 605 performs the operation on the pixels (730).

The embodiments described herein may be implemented as a board level product, as a single chip, application specific integrated circuit (ASIC), or with varying levels of the system integrated with other portions of the system as separate components.

The degree of integration may primarily be determined by the speed and cost considerations. Because of the sophisticated nature of modern processors, it is possible to utilize a commercially available processor, which may be implemented external to an ASIC implementation.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    a single instruction, multiple data (SIMD) processor, the SIMD processor comprising an instruction memory for storing a set of instructions and a plurality of processing elements configured to concurrently execute an instruction from the set of instructions on a corresponding plurality of pixels from a row in at least one prediction error and a corresponding plurality of pixels from a row in at least one block of prediction pixels; and
    a data access circuitry for providing the at least one prediction error and the at least one block of prediction pixels; and
    a circuit for determining whether two or more prediction errors and two or more prediction pixels can be concurrently processed by the SIMD processor.

2. The system of claim 1, wherein the plurality of processing elements comprises at least 16 processing elements configured to perform an operation dictated by the instruction from the set of instructions.

3. A system comprising:
    a single instruction, multiple data (SIMD) processor the SIMD processor comprising an instruction memory for storing a set of instructions and a plurality of processing elements configured to concurrently execute an instruction from the set of instructions on a corresponding plurality of pixels from a row in at least one prediction error and a corresponding plurality of pixels from a row in at least one block of prediction pixels; and
    a data access circuitry for providing the one or more blocks of pixels; and
    a circuit for determining whether one or more blocks associated with two or more partitions can be concurrently processed by the SIMD processor.

4. The system of claim 3, wherein the plurality of processing elements comprises at least 16 processing elements configured to perform an operation dictated by the instruction from the set of instructions.

5. The system of claim 3, wherein processing one or more blocks associated with at least one partition comprises interpolating reference pixels from the one or more blocks.

6. The system of claim 3, wherein processing one or more blocks associated with at least one partition comprises applying a first weight to a first one of the one or more blocks and a second weight to a second one of the one or more blocks.

7. The system of claim 3, further comprising:
    a direct memory access circuitry for fetching a plurality of words from a memory, wherein the plurality of words comprise the one or more blocks of pixels and additional pixels.

8. system of claim 7, wherein the data access circuitry selects at least a portion of the one or more blocks of pixels from the words from the memory.

9. A method for generating reconstructed pixels, said method comprising:
    determining whether two or more prediction errors and two or more prediction pixels can be concurrently processed by a single instruction, multiple data (SIMD) processor;
    if the two or more prediction errors and the two or more prediction pixels can be concurrently processed:
        consolidating the two or more prediction errors and the two or more prediction pixels;
        concurrently applying the two or more prediction errors to the two or more prediction pixels by concurrently executing an instruction of a set of instructions on a plurality of pixels from a row in the at least one prediction error and a corresponding plurality of pixels from a row in the at least one block of prediction pixels.

10. The method of claim 9, wherein the plurality of pixels from the row in the at least one prediction error comprises 16 pixels.

11. A method for generating prediction pixels, said method comprising:
    determining whether a first block of prediction pixels and a second block of prediction pixels can be concurrently generated, by a single instruction, multiple data (SIMD) processor, from a first one or more blocks of pixels associated with a first partition and a second one or more blocks associated with a second partition;
    if the first block of prediction pixels and the second block of prediction pixels can be concurrently generated:
        consolidating the first one or more blocks and the second one or more blocks; and
        concurrently processing, by the SIMD processor, a plurality of pixels from a row in the first one or more blocks and a plurality of pixels from a row in the second one or more blocks.

12. The method of claim 11, wherein the plurality of pixels in the row of the first block comprise at least 19 pixels.

13. The method of claim 11, wherein processing further comprises interpolating.

14. The method of claim 11, wherein processing one or more blocks associated with at least one partition comprises processing two or more blocks.

15. The method of claim 11, further comprising:
   fetching a plurality of words from a memory, wherein the plurality of words comprise the one or more blocks of pixels and additional pixels.

16. The method of claim 15, further comprising selecting the one or more blocks of pixels from the words from the memory.

\* \* \* \* \*